United States Patent
Moilanen et al.

(10) Patent No.: US 6,948,708 B2
(45) Date of Patent: Sep. 27, 2005

(54) GRIPPER PROVIDED WITH AN ADJUSTABLE SENSOR ASSEMBLY

(75) Inventors: Steven M. Moilanen, Ft. Wayne, IN (US); William D. Givens, Berne, IN (US); Bruce D. McIntosh, Monroeville, IN (US)

(73) Assignee: PHd, Inc., Fort Wayne, IN (US)

( * ) Notice: Subject to any disclaimer, the term of this patent is extended or adjusted under 35 U.S.C. 154(b) by 128 days.

(21) Appl. No.: 10/398,291

(22) PCT Filed: Mar. 15, 2002

(86) PCT No.: PCT/US02/08132

§ 371 (c)(1),
(2), (4) Date: Apr. 3, 2003

(87) PCT Pub. No.: WO02/074503

PCT Pub. Date: Sep. 26, 2002

(65) Prior Publication Data

US 2004/0130083 A1 Jul. 8, 2004

Related U.S. Application Data

(60) Provisional application No. 60/354,218, filed on Feb. 4, 2002, and provisional application No. 60/276,547, filed on Mar. 16, 2001.

(51) Int. Cl.$^7$ ................................................ B23Q 3/08
(52) U.S. Cl. ............................ 269/32; 269/228; 269/27
(58) Field of Search .......................... 269/32, 228, 20, 269/27, 24, 225, 237–239

(56) References Cited

U.S. PATENT DOCUMENTS

| | | | |
|---|---|---|---|
| 4,579,380 A | | 4/1986 | Zaremsky et al. |
| 5,090,757 A | | 2/1992 | Huber et al. |
| 5,261,715 A | | 11/1993 | Blatt et al. |
| 5,383,697 A | | 1/1995 | Roudaut |
| 5,503,378 A | * | 4/1996 | Schauss et al. ............... 269/32 |
| 5,516,173 A | * | 5/1996 | Sawdon .................... 294/86.4 |
| 5,871,250 A | | 2/1999 | Sawdon |
| 6,354,580 B1 | * | 3/2002 | Nagai et al. ................ 269/225 |
| 6,428,070 B1 | | 8/2002 | Takanashi et al. |
| 6,609,705 B1 | * | 8/2003 | Schindler et al. ............. 269/34 |
| 6,666,489 B2 | * | 12/2003 | Kruger ....................... 294/88 |
| 2004/0130083 A1 | * | 7/2004 | Mollanen et al. ............. 269/32 |

* cited by examiner

Primary Examiner—Lee D. Wilson
(74) Attorney, Agent, or Firm—Barnes & Thornburg LLP

(57) ABSTRACT

A fluid actuated parts gripper assembly is provided. The fluid actuated parts gripper assembly has a pair of opposable pivoting jaw members, a fluid driven actuator, a linkage structure, a sensor target, a mounting and a sensor. The linkage structure is driven by the fluid driven actuator and is coupled to at least one of the pair of opposable jaw members. The sensor target is coupled to the linkage structure and is movable therewith. The mounting is located adjacent the sensor target and the sensor is mounted on the mounting configured to detect the sensor target.

16 Claims, 11 Drawing Sheets

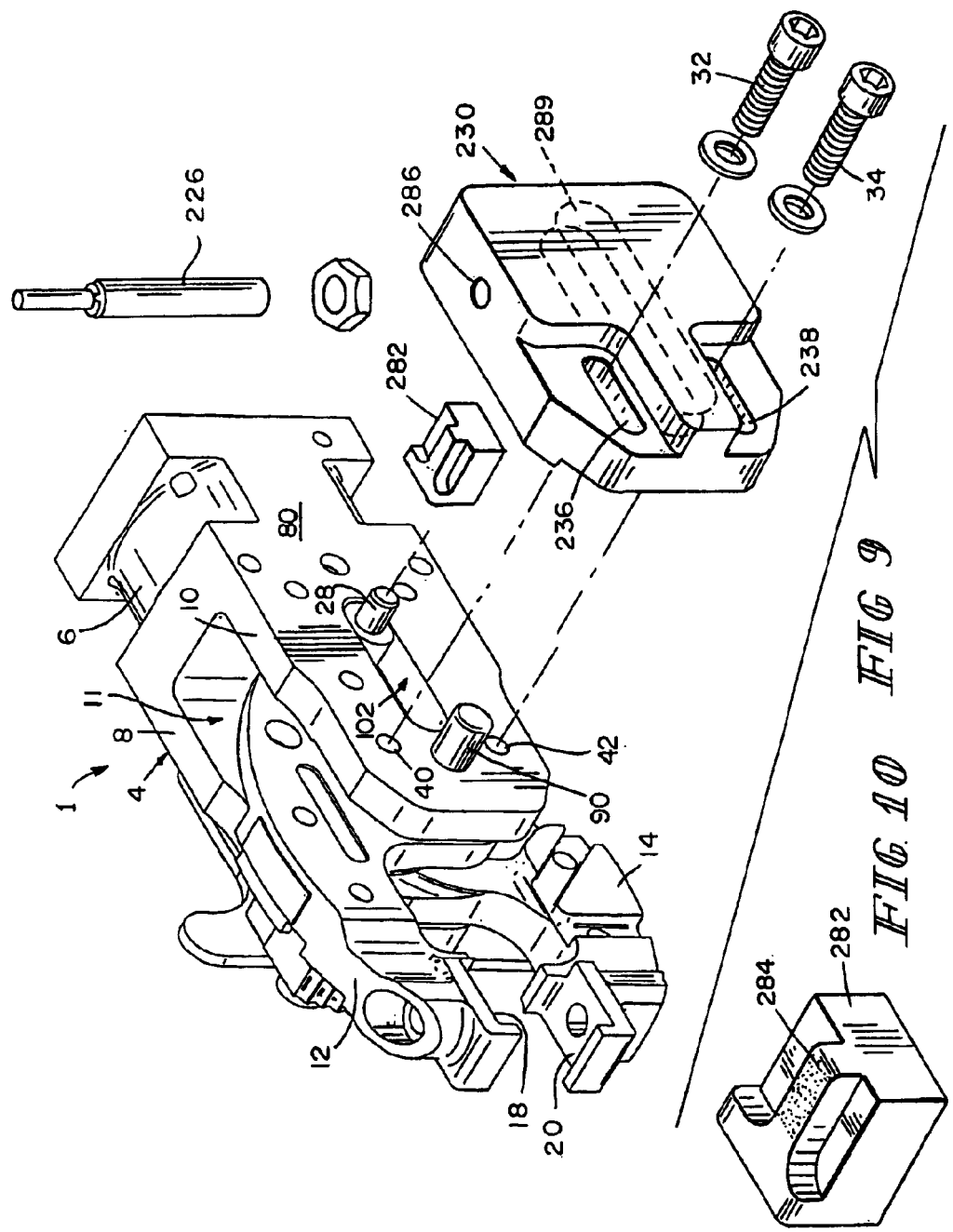

GRIPPER PROVIDED WITH AN ADJUSTABLE SENSOR ASSEMBLY

RELATED APPLICATIONS

The present application is a U.S. national counterpart application of International Application Serial No. PCT/US02/08132 filed Mar. 15, 2002, which claims priority to U.S. Provisional Patent Application Ser. No. 60/276,547, filed on Mar. 16, 2001, entitled ARTICLE SENSOR ASSEMBLY FOR GRIPPER; U.S. Utility Patent Application Ser. No. 09/976,778 filed on Oct. 12, 2001, entitled ARTICLE SENSOR ASSEMBLY; U.S. Provisional Patent Application Ser. No. 60/354,218, filed on Feb. 4, 2002, entitled ARTICLE SENSOR ASSEMBLY FOR GRIPPER. The subject matter disclosed in these applications is hereby expressly incorporated into the present application.

TECHNICAL FIELD

The present disclosure relates to fluid actuated grippers of the type employed in automated workpiece handling devices which clampingly grip and transfer a workpiece from one station to another. More particularly, the present invention relates to adjustable article sensor assemblies for such fluid actuated grippers which can detect specific orientations of the jaw member portion of the fluid actuated grippers.

BACKGROUND AND SUMMARY

Fluid pressure actuated grippers are widely employed and typically take the form of a pneumatic or hydraulic differential motor whose cylinder is fixedly mounted to a transfer device. At the forward or rod end of the cylinder housing, a gripper jaw mounting structure is fixedly mounted on the cylinder to pivotally support a pair of opposed gripper jaws which are coupled to the piston rod of the motor by a linkage. This arrangement allows movement of the piston in one direction so that the jaws are pivoted to an open position, and upon movement of the piston in the opposite direction the jaws are driven to a closed workpiece gripping position. In typical operation, the gripper jaws close upon a workpiece grasping same, and advance to position the workpiece in some operative relationship with a work station or portion of a production line. The gripper then opens to release the workpiece and retracts from the work station or production line while the work operation or task is performed. At the conclusion of the operation or task, the gripper advances back into the work station and the jaws again close upon the workpiece and carry it away from the work station.

Such fluid pressure actuated grippers are generally designed for use with particular workpieces to be transferred and with specific work stations or production lines. For example, some workpieces and/or work stations may require wider or narrower gripper jaws, different types of gripper jaws, gripper jaws that open at different angles, jaws that require different clearance requirements, etc., to complete a particular task. Furthermore, such grippers carry workpieces which may be of a variety of sizes or thicknesses.

A known problem associated with production lines employing numerous grippers, each of which are completing a specific task as part of a sophisticated series of operations, is that if one gripper fails to complete its task, it could create multiple failures along the production line. This failure has the potential of stopping the entire production line, thus, delaying completion of the operation, as well as the possibility of delaying other dependent operations.

A common type of failure is the gripper failing to grip the workpiece. Typically, the workpiece falls out of the gripper while it is being carried. Another common failure is the gripper carrying more than one workpiece at a time (commonly termed double sheeting). Consequently, these failures can damage equipment which translates into increased costs and potential losses in both time and revenue. It would, therefore, be beneficial to provide an article sensing assembly for use with fluid actuated grippers. It would be further beneficial to provide an article sensing assembly that can be adjustable for use with various gripping arrangements.

Accordingly, an illustrative embodiment of the present disclosure provides a fluid actuated parts gripper assembly comprising, a pair of opposable pivoting jaw members, a fluid driven actuator, a linkage structure, a sensor target, a mounting and a sensor. The linkage structure is driven by the fluid driven actuator and is coupled to at least one of the pair of opposable jaw members. In addition, the fluid driven actuator causes the linkage structure to move at least one of the pair of opposable jaw members. The sensor target is coupled to the linkage structure and is movable therewith. The mounting is located adjacent the sensor target. The sensor is mounted on the mounting configured to detect the sensor target.

Other illustrative embodiments may comprise the mounting being adjustable relative to the sensor target; the sensor being fixed relative to the mounting; the mounting being configured to receive the sensor target such that the sensor target is moveable within the mounting; the mounting including a slot within which the sensor target is moveable; the mounting comprising at least one slot configured to receive a fastener that selectively fixes the mounting to the gripper; the at least one slot is a pair of slots; an adjustment member coupled to the mounting for incrementally adjusting the location of the mounting relative to at least one of the pair of jaw members; the adjustment number being an adjustable spacer comprising a body having a plurality of sides, each of the plurality of sides located at a different length from a central location on the body; the central location of the adjustable spacer being a bore disposed there through; the adjustable spacer having opposed surfaces, each being non-equidistant from the location; the adjustable spacer being a hexagonal body with opposed surfaces each being non-equidistant from the location; the at least one of the opposed surfaces of the adjustable spacer being positionable adjacent an abutment located on the mounting to selectively reposition the mounting relative to the gripper assembly; the member is a pivot body that pivots about an axis of rotation and is engagable with a portion of the mounting a distance spaced apart from the axis of rotation; an engagement member attached to the pivot body being engagable to a corresponding receiver in the mounting to secure the mounting to the gripper assembly a determined position; the engagement member being engagable with a plurality of receivers in the mountings.

Additional features and advantages of the gripper assembly will become apparent to those skilled in the art upon consideration of the following detailed description of the illustrated embodiment exemplifying the best mode of carrying out the gripper assembly as presently perceived.

BRIEF DESCRIPTION OF DRAWINGS

The present disclosure will be described hereafter with reference to the attached drawings which are given as non-limiting examples only, in which:

FIG. 9 is a perspective view of the fluid actuated gripper with another embodiment of the article sensor assembly shown in exploded view;

FIG. 10 is a perspective view of a sensor target illustratively for use with the article sensor assembly of FIG. 9;

Corresponding reference characters indicate corresponding parts throughout the several views. The exemplification set out herein illustrates embodiments of the article sensor assembly, and such exemplification is not to be construed as limiting the scope of the article sensor assembly in any manner.

DETAILED DESCRIPTION OF THE DRAWINGS

Figure 1:
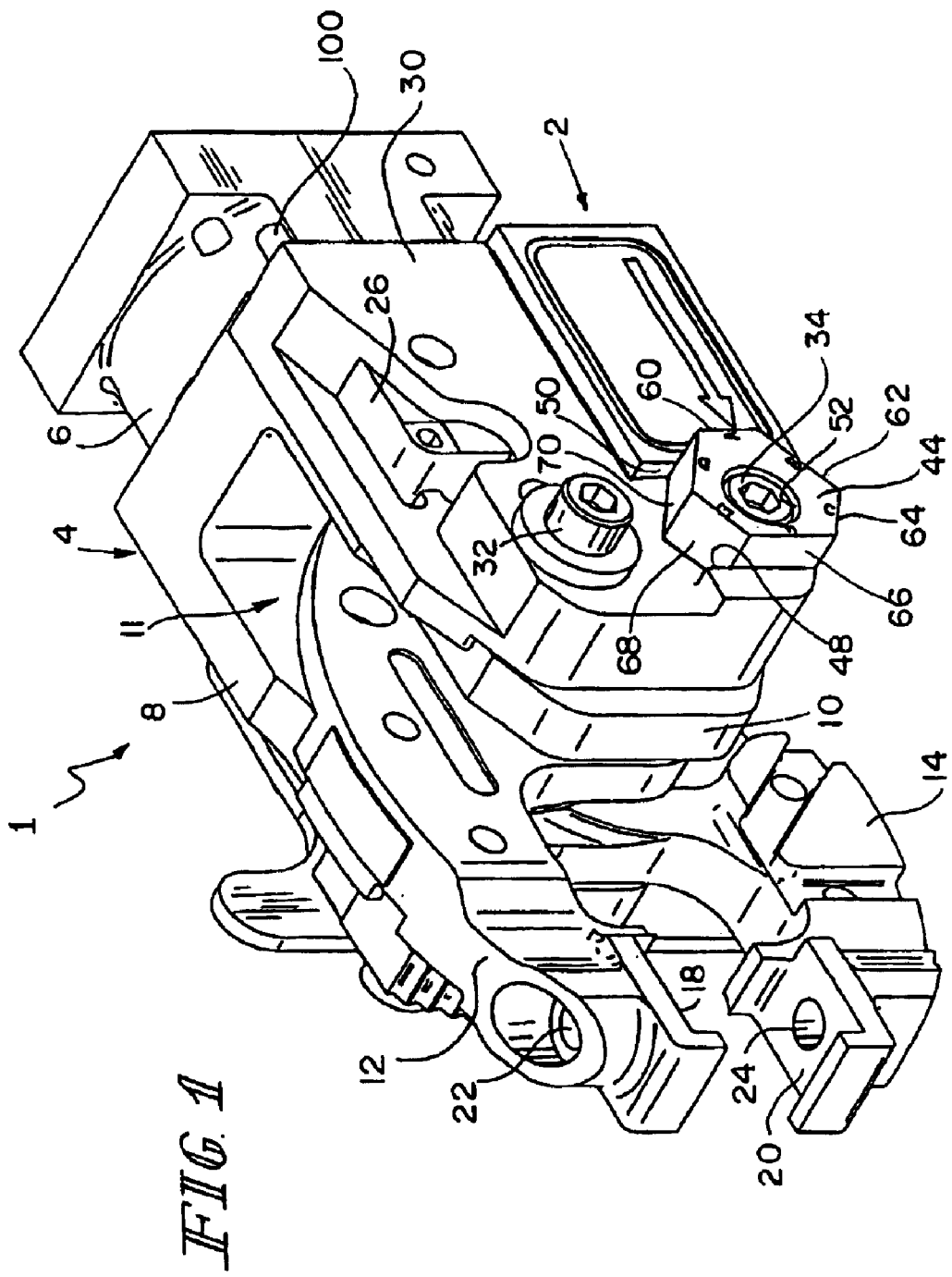
FIG. 1 is a perspective view of a fluid actuated gripper having an article sensor assembly attached thereto.

The present disclosure is directed to a fluid actuated gripper 1 having an article sensor assembly 2 attached thereto, as shown in FIG. 1. The fluid actuated gripper 1, illustratively, comprises a yoke structure 4 which is coupled to a body 6. Illustratively, body 6 is a pneumatic or hydraulic differential motor cylinder. Yoke structure 4 is defined by two, generally parallel, spaced apart side walls 8, 10. According to the illustrated embodiment, each wall 8, 10 extends outwardly from the body 6, with a cut-out portion 11 located there between. It is appreciated that the body 6 can be oriented in any manner with respect to yoke structure 4. Examples of the types of grippers for use with the article sensor assembly 2, as described further herein, are U.S. Pat. No. 6,273,408, entitled MOUNTING BRACKET FOR MODULAR WORKPIECE HOLDER, U.S. Pat. No. 6,048,013, entitled MODULAR STAMPED PARTS TRANSFER GRIPPER, U.S. Pat. No. 6,056,281, entitled ADJUSTABLE STOPPERS AND MOUNTING ASSEMBLIES FOR PARTS GRIPPERS, and U.S. Pat. No. 5,941,513, entitled MOUNTING BRACKET FOR MODULAR WORKPIECE HOLDER, all of the disclosures of which are hereby expressly incorporated by reference.

A pair of opposable jaw members 12, 14 are located in cut-out portion 11. Illustratively, each jaw member 12, 14 is pivotable about a common axis (pivot pin 90, see FIG. 2), pursuant to pneumatic action commonly known in the art. It is appreciated that movement of jaw members 12, 14 can be actuated by any means, including electrical or other fluid, both means known commonly in the art. As depicted, jaw member tips 18 and 20, located at the ends of jaw members 12, 14, respectively, oppose each other, are movable between open and closed positions as jaw members 12, 14 move, and are configured to receive gripper tips (not shown) of any variety for carrying a workpiece. Each jaw member tip 18, 20, illustratively, includes a threaded bore 22, 24, respectively, each configured to receive a corresponding threaded screw of a gripper tip.

Article sensor assembly 2 is, illustratively, attached to wall 10 of yoke structure 4. As jaw members 12, 14 move, a sensor 26 detects such movement. In an illustrative embodiment, sensor 26 detects the relative position of jaw members 12, 14 with respect to yoke structure 4. Specifically, and as discussed further herein, the sensor 26 detects a target 82 when moved to a predetermined location, thus, indicating that the cam pin 28 is at that location. (See FIG. 3.) Because jaw members 12, 14 are movable in response to movement of cam pin 28, sensor 26, in essence, detects the degree of opening between jaw member tips 18 and 20. When jaw member tips 18 and 20 are separated by a predetermined amount, sensor 26 will detect same and either send a signal to a controller (not shown), or illuminate a light, like a LED, indicating detection. It is contemplated that the configuration of such an article sensor assembly 2 can detect whether one or more workpieces are being held between jaw members 12, 14. The sensor 26 can also be connected to a stop mechanism (not shown) to control the degree of separation between the jaw members. Alternatively, it is contemplated that sensor 26 can be used to sound an alarm if jaw members 12, 14 reach a particular separation.

Because the length of separation between jaw members 12, 14 might be a variable amount, it is contemplated that one embodiment of article sensor assembly 2 can be adjustable. In the illustrated embodiment, an operator can move sensor housing 30 relative to wall 10. Moving sensor housing 30 moves the point at which sensor 26 will detect target 82. (See also FIGS. 4 through 5.) Sensor housing 30 is movable consonant with the loosening of two fasteners 32, 34, which are disposed through slots 36, 38, respectively, and fastened to bores 40, 42, respectively, in wall 10. (See FIG. 2.) According to the illustrated embodiment, sensor housing 30 can move to any location along a direction generally parallel with linear orientation of wall 10 within the length of slots 36, 38. It is contemplated that other aperture, or aperture-like structures, can be used to define the movement of sensor housing 30 in the stead of slots 36, 38.

To assist in controlling the amount of movement available by sensor housing 30, a stop washer 44 is coupled with fastener 34 and housing 30 to limit movement of same. One illustrated embodiment shown in FIG. 1 shows stop washer 44 positioned between stop edges 48, 50 which are part of sensor housing 30. Edges 48, 50 limit lateral movement of stop washer 44, thus, ensuring a proper and consistent fit of stop washer 44 within sensor housing 30. In the illustrated embodiment, stop washer 44 is a hexagonal structure having six surfaces 60, 62, 64, 66, 68, 70. A central bore 52 is disposed through stop washer 44 which receives fastener 34. Central bore 52 is not necessarily positioned in the center of stop washer 44. Rather, central bore 52 is offset such that opposite surfaces of stop washer 44 are different distances from central bore 52. For example, side 60 is one distance (in this illustrative embodiment, a distance of 0.52 inches), and the opposite edge 66 is a second distance (illustratively, a distance of 0.28 inches).

The effect of this offset positioning of central bore 52 is that stop washer 44 can be rotated, and each edge that is placed adjacent edge 50, for example, moves sensor housing 30 a specific and repeatable distance relative to wall 10. Specifically, though each surface 60, 62, 64, 66, 68, 70 is a different distance from the central bore, each opposed surface equals the same diameter as every other diameter. For example, the distance between surfaces 60 and 66 is, illustratively, 0.80 inches and, similarly, distances between 62 and 68, and between 64 and 70 are each 0.80 inches as well. Having the same diameter allows the stop washer 44 to be rotated, and each will fit adjacent edges 48, 50. Because fastener 34 remains fixed in bore 42, and sensor housing 30 is movable along fastener 34 the extent of slot 38, this offset positioning of central bore 52, in combination with the different distances of edges causes sensor housing 30 to move in direction 72 or 74 depending on which orientation the stop washer 44 is positioned between edges 48, 50 of housing 30. (See FIG. 2.) Furthermore, because this illustrative embodiment includes each side being a unique distance from central bore 52, yet, each pair of opposed surfaces being identical diameters apart, allows an operator to move different surfaces adjacent edges 48, 50, thereby moving sensor housing 30 incrementally. For example, by moving surface 62 from surface 60, adjacent edge 50, sensor housing 30 will move 0.04 inches in the direction of 72. Moving stop surface 64 from surface 62, adjacent edge 50, sensor housing 30 will move an additional 0.04 inches in the direction of 72. The reverse is true as well. Moving surface 66 from surface 64, adjacent edge 50, sensor housing 30 will move 0.04 inches in the direction of 74. Moving surface 68 from surface 66, adjacent edge 50, sensor housing 30 will move another 0.04 inches in the direction of 74. Moving surface 60 from surface 66, adjacent edge 50, sensor housing 30 will move a total of 0.20 inches in the direction of 74 from surface 64.

Figure 2:
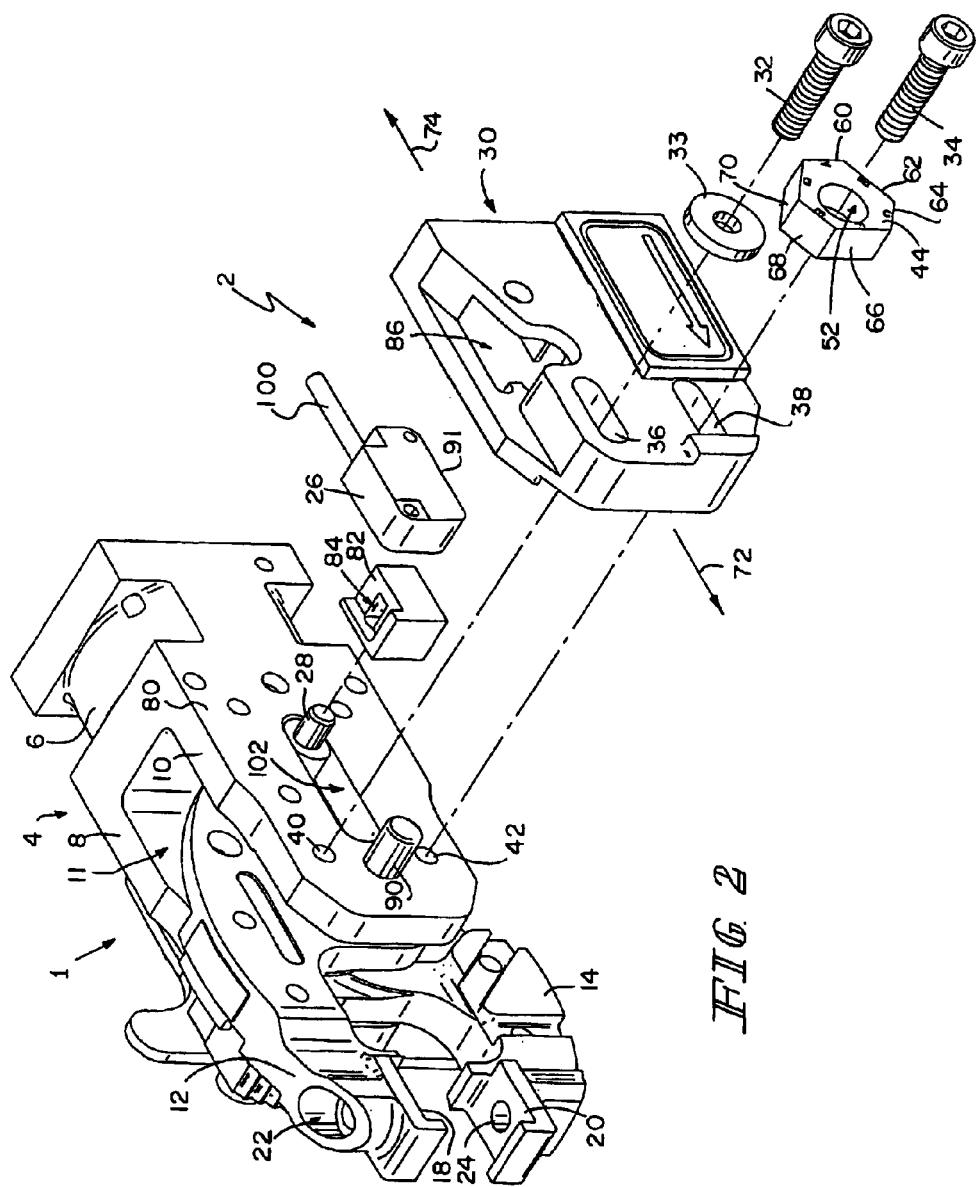
FIG. 2 is a perspective view of the fluid actuated gripper of FIG. 1 with the article sensor assembly shown in exploded view.

Another perspective view of the fluid actuated gripper 1 is shown in FIG. 2. Also shown is the article sensor assembly 2 in exploded view. Specifically, shown is how sensor housing 30 attaches adjacent surface 80 of wall 10. Target 82, illustratively, includes a bore 84 through which cam pin 28 extends, thereby coupling the two structures together. (See FIG. 3.) Sensor 26 is placed into sensor recess 86 which includes an access slot 88 thereby allowing access of sensing portion 91 of sensor 26 to target 82 when the target is located within slot 89 of housing 30. (See FIGS. 3 and 7.) Sensor housing 30 is secured adjacent surface 80 via fasteners 32, 34 which are disposed through slots 36, 38, respectively, and fastened to bores 40, 42, respectively, in wall 10, as previously discussed. As is common with the fasteners of the type shown in FIG. 2, as they tighten, sensor housing 30 is increasingly secured against wall 10.

Figure 3:
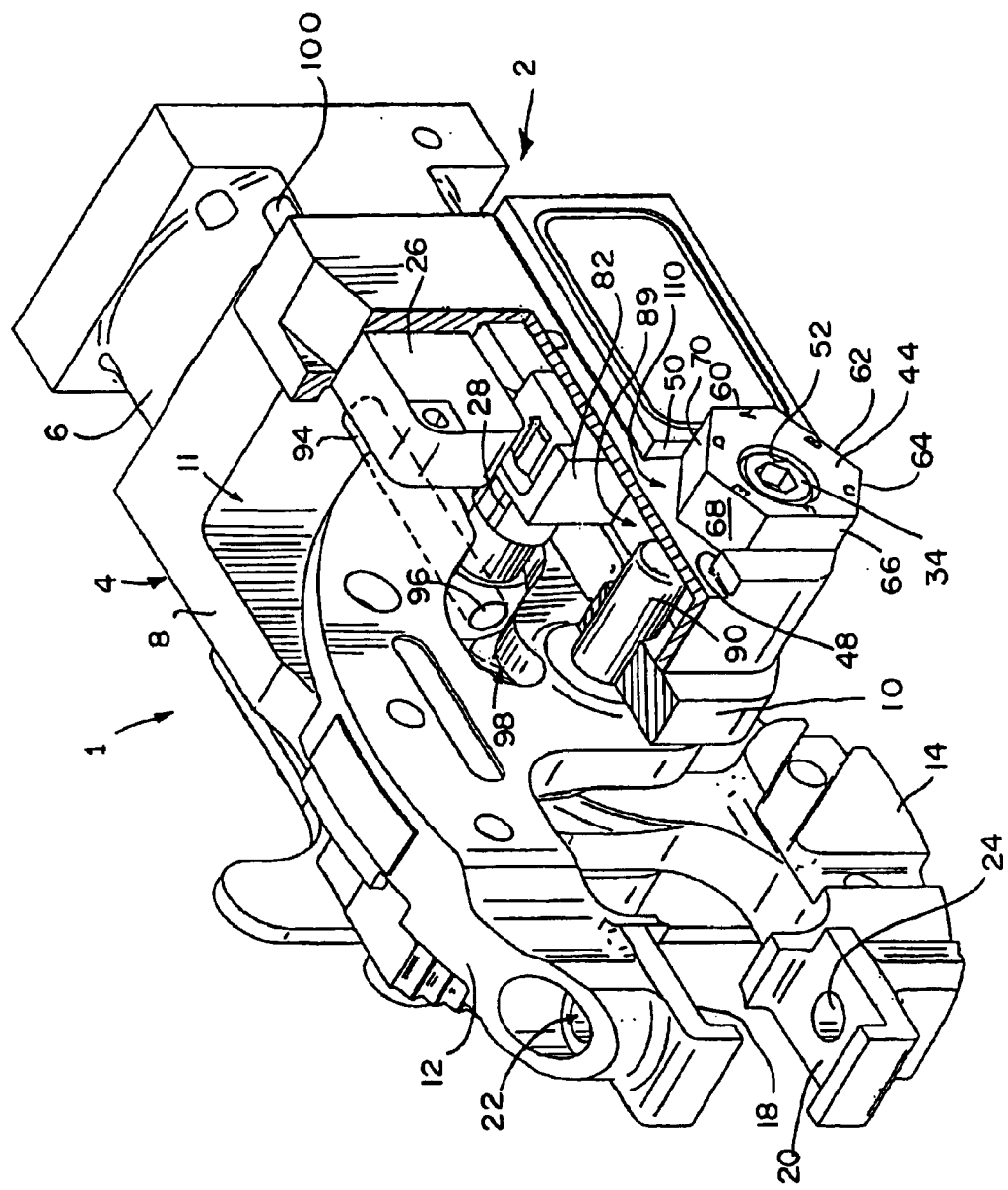
FIG. 3 is a partially cut-away perspective view of the fluid actuated gripper of FIG. 1 with the article sensor assembly attached thereto.

A partially cut-away perspective view of the fluid actuated gripper 1 and the article sensor assembly 2 attached thereto is shown in FIG. 3. This view shows the spatial relationship and interaction between the major components of the fluid actuated gripper 1 and the article sensor assembly 2. A piston rod 94 links jaw members 12, 14 to the pneumatic or hydraulic differential motor cylinder, or other motor driver. Specifically, piston rod 94 is coupled to a bushing 96 which itself is coupled to cam pin 28. As piston rod 94 moves reciprocally in directions 72 and 74, cam pin 28 is caused to move in concert therewith. The movement of cam pin 28 causes same to engage cam slots 98 which exist on both jaw members 12, 14. In the illustrated embodiment, as piston rod 94 moves cam pin 28 in direction 72, cam pin 28 follows the path of cam slots 98, thereby causing the jaw members 12, 14 to open by pivoting about a pivot pin 90. Conversely, as piston rod 94 moves cam pin 28 in direction 74, cam pin 28 follows the reverse path of cam slots 98, thereby causing the jaw members 12, 14 to close by pivoting about pivot pin 90. It is appreciated that both jaw members 12, 14 do not necessarily have to pivot about pivot pin 90. Gripper 1 may be so configured that only one jaw member, either 12 or 14, may pivot.

Additionally, pivot pin 90 is shown extending into slot 89. As cam pin 28 moves in either direction 72 or 74, so too does target 82. Target 82 is configured to move within slot 89 of sensor housing 30. Sensor 26, positioned above slot 89 and target 82, illustratively, remains stationary relative to slot 89. Accordingly, as cam pin 28 moves both target 82 and jaw members 12, 14, target 82 will pass underneath sensor 26 at some location along slot 89. At this point, sensor 26 will detect the presence of target 82, and signal the controller through line 100 to initiate a desired response. Alternatively, line 100 may be a power cord, and sensor 26 and target 82 form a switch that powers a LED (not shown) when in contact.

The adjustability of sensor housing 30 allows that point at which the sensor 26 detects the target 82 to be anywhere along the slot 102 through which cam pin 28 extends, and which defines the extent to which cam pin 28 can travel. By rotating stop washer 44 to various positions, sensor housing 30 moves along surface 80 to specific repeatable distances, changing the point at which the sensor 26 detects target 82.

Figure 4:
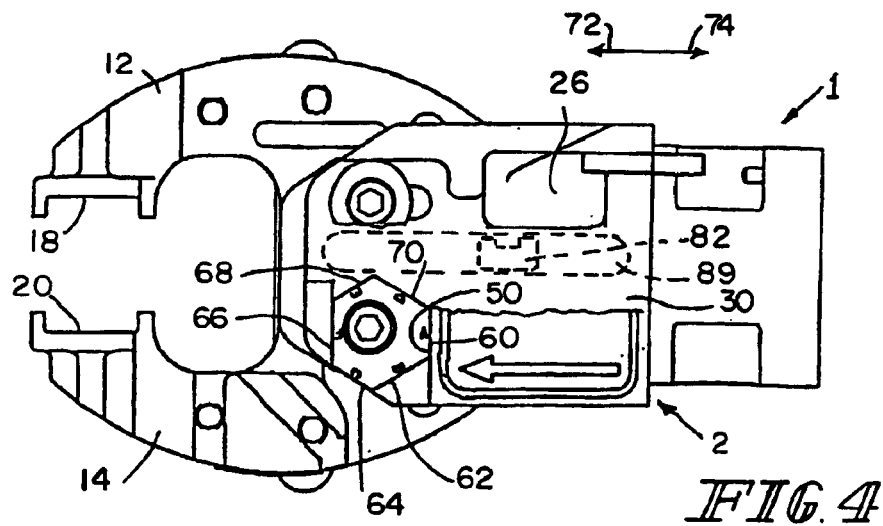
FIG. 4 is a side view of the fluid actuated gripper of FIG. 1 showing a first position of the article sensor assembly relative to the gripper body.
Figure 5:
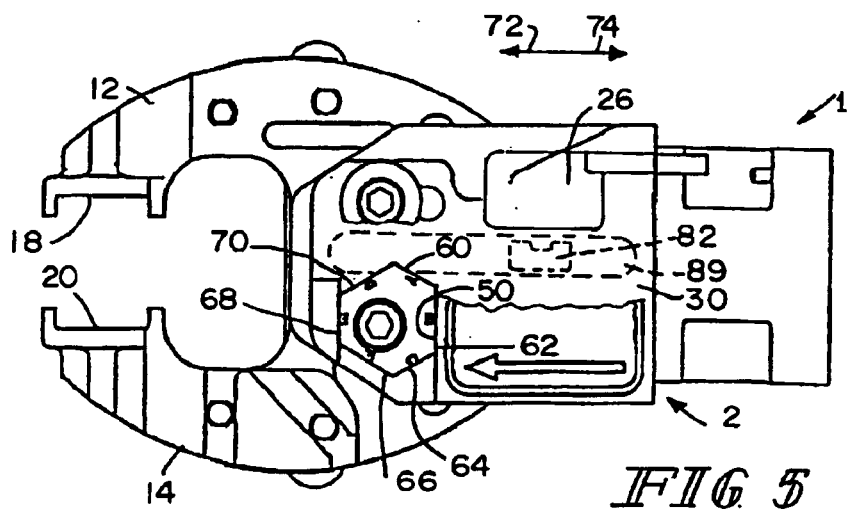
FIG. 5 is another side view of the fluid actuated gripper of FIG. 1 showing a first successive adjustment position of the article sensor assembly relative to the gripper body.
Figure 6:
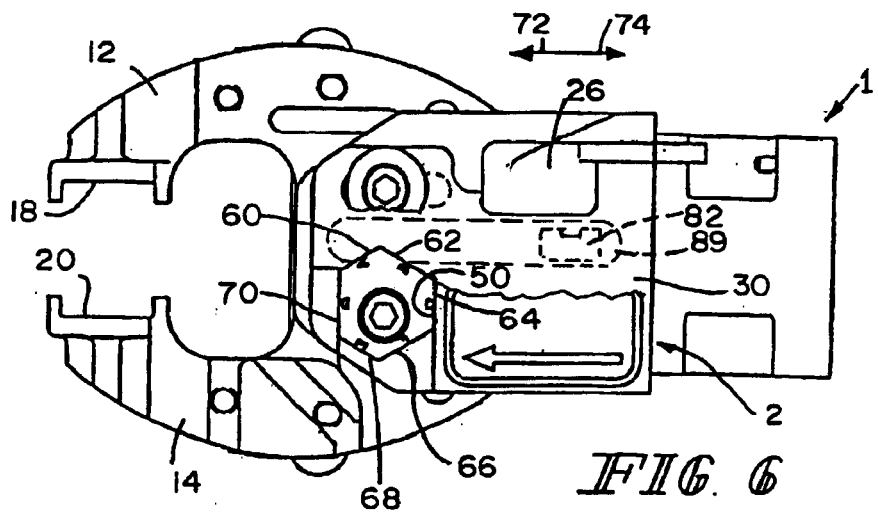
FIG. 6 is another side view of the fluid actuated gripper of FIG. 1 showing a second successive adjustment position of the article sensor assembly relative to the gripper body.

FIGS. 4 through 6 illustrate the adjustability of sensor housing 30 relative to the position of stop washer 44 for detecting target 82 at different positions along slot 89. As shown in FIG. 4, stop washer 44 is positioned such that surface 60 is located adjacent edge 50 of sensor housing 30. In this illustrative embodiment, target 82 is positioned underneath sensor 26. As shown in FIG. 5, stop washer 44 is positioned such that surface 62 is located adjacent edge 50 of sensor housing 30. In this case, target 82 is still positioned underneath sensor 26, but with sensor housing 30 moved in direction 72 to a new position, target 82 will move further in direction 72 for the sensor 26 to still detect the target 82. As shown in FIG. 6, stop washer 44 is positioned such that surface 64 is located adjacent edge 50 of sensor housing 30. In this case, target 82 is, again, positioned underneath sensor 26, but sensor housing 30 is also, again, moved in direction 72 to another new position. Consequently, target 82 will, again, move further in direction 72 for the sensor 26 to still detect the target 82. Thus, sensor 26 will detect target 82 as the separation between jaw tips 18, 20 increases between stop member surfaces 60 through 64.

Figure 7:
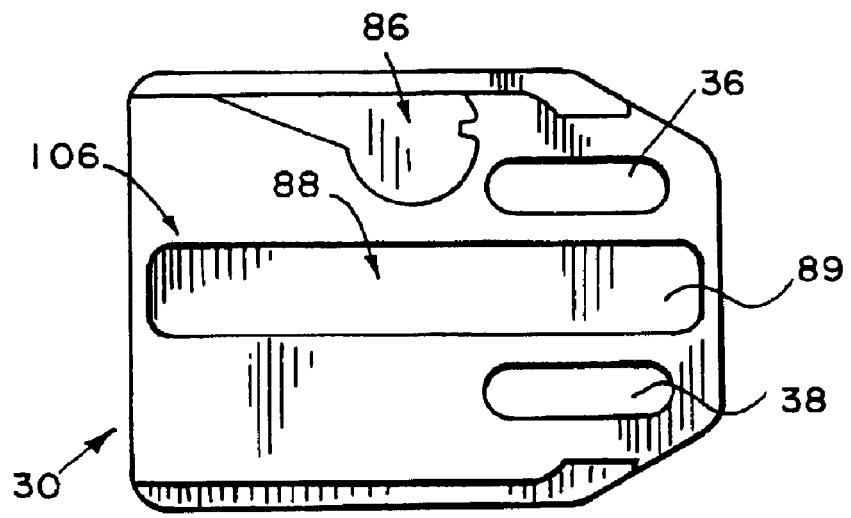
FIG. 7 is an elevation side view of the outer face of the sensor housing portion of the sensor assembly of FIG. 1.
Figure 8:
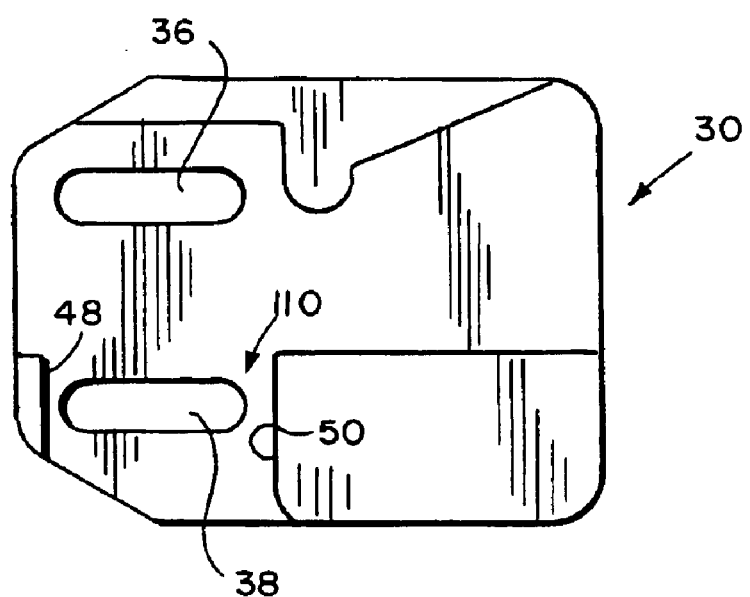
FIG. 8 is an elevation side view of the rear of the sensor housing portion of the sensor assembly of FIG. 1.

Conversely, and not shown, moving stop washer 44 to a position such that surface 66 is located adjacent edge 50 causes sensor housing 30 to move in direction 74, causing sensor 26 to also move further in direction 74 in order to contact target 82. One embodiment of sensor housing 30 is shown in FIGS. 7 and 8. The rear view of housing 30 shows slot 89 and access slot 88 there above, allowing sensor 26 to rest on ledge 106 and access target 82 when positioned within slot 89. It is appreciated that in such an embodiment, sensor 26 detects target 82 at the same position relative to slot 89. The position at which target 82 is detected relative to distance between tips 18, 20 is dependent on the position of sensor housing 30 relative to wall 10. For example, illustratively, sensor 26 may detect target 82 every time target 82 passes the longitudinal center of slot 89, regardless of what the desired position of tips 18, 20 should be when the operator wishes the sensor to react. To set assembly 2 so that sensor 26 will detect target 82 when the tips 18, 20 are at the desired separation, housing 30 will be positioned at a location adjacent surface 80 such that the target 82 is aligned with sensor 26 when the tips have the desired separation.

Housing 30 also includes a recess portion 110 that contains slot 38 and is bordered by edges 48, 50. Recess 110 is sized to receive stop washer 44. It is contemplated that other embodiments of housing 30 may not comprise such a recess 110 or edges 48, 50, but rather, include merely the slot 38 allowing free adjustability of the housing relative surface 80 of wall 10. (See FIG. 9.)

The fluid actuated gripper 1 is shown in FIG. 9 with another embodiment of the article sensor assembly 202 shown in exploded view. Article sensor assembly 202 is attachable to wall 10 of yoke structure 4. As jaw members 12, 14 move, a sensor 226 detects such movement. In an illustrative embodiment, sensor 226 detects the relative position of the jaw members with respect to yoke structure 4. Specifically, the sensor 226 detects a cam pin 28 when moved to a predetermined location, thus, indicating that the cam pin 28 is at that location, as previously discussed. When jaw member tips 18 and 20 are separated by a predetermined distance, sensor 226 will detect same, and send a signal to a controller or illuminate a LED, also as previously discussed.

Similar to article sensor assembly 2, it is contemplated that sensor assembly 202 can also be adjustable. The distinction between the illustrated embodiment of sensor assembly 202 and assembly 2 is that assembly 202 does not utilize stop washer 44. In the illustrated embodiment of sensor assembly 202, sensor housing 230 is movable consonant with the loosening of two fasteners 32, 34 which are disposed through slots 236, 238, respectively, and fastened to bores 40, 42, respectively, within wall 10. According to the illustrated embodiment, sensor housing 230 can move to any location along a direction parallel with linear orientation of wall 10 within the length of slots 236,238. It is contemplated that a stop washer like that of stop washer 44 is not required to this embodiment.

Fluid actuated gripper 1 is also shown in FIG. 7 with the sensor assembly 202 attached thereto, along with an illustrative range of movement of same (in hatched lines). It is appreciated from this view the range of movement available which is not dependent on fixed increments established by a stop washer.

Figure 11:
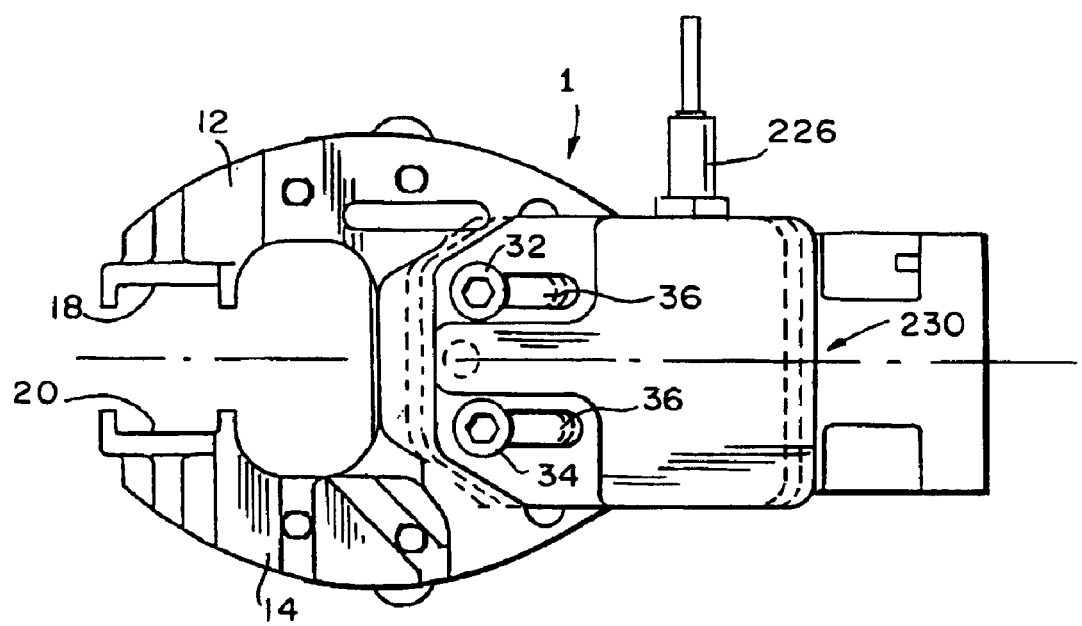
FIG. 11 is a side view of the fluid actuated gripper and article sensor assembly of FIG. 9.

A target 282 is shown in both FIGS. 9 and 10. Target 282, illustratively, includes a target surface 284, detectable by sensor 226. (See FIG. 11.) Sensor 226 is placed into sensor bore 286 which provides access to target surface 284 when target 282 is positioned in slot 289 (in hatched lines) of housing 230.

Figure 12:
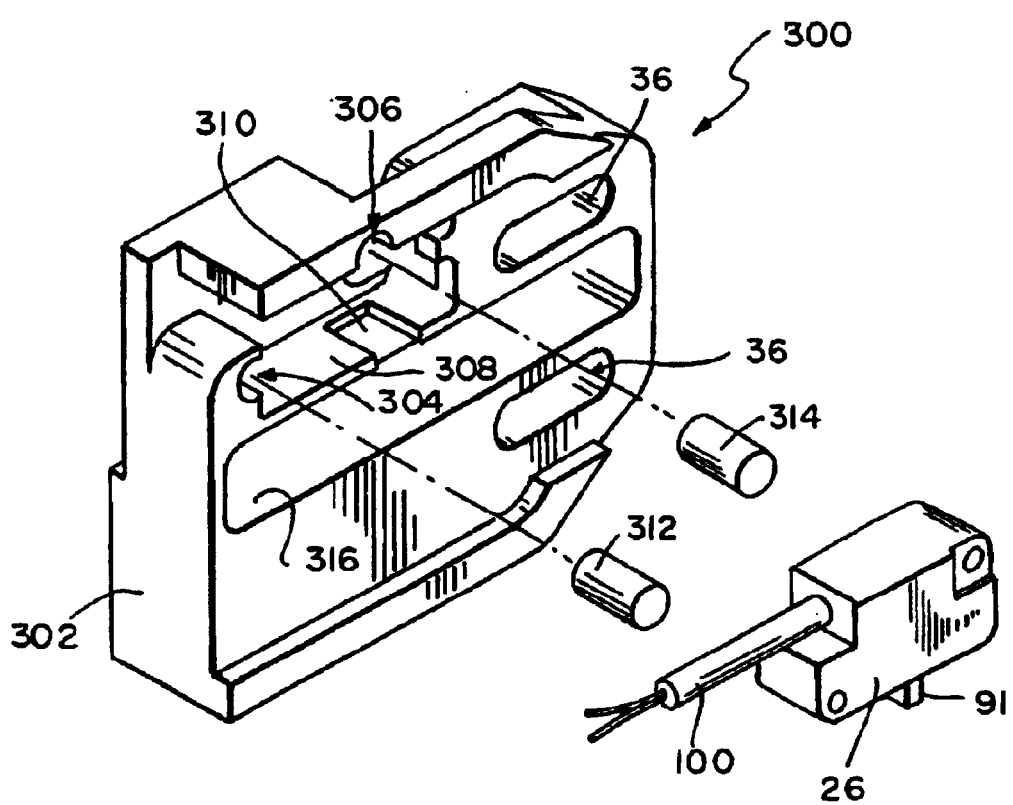
FIG. 12 is an exploded rear perspective view of another embodiment of the article sensor assembly.

An illustrative embodiment of an article sensor assembly 300 is shown in FIG. 12. Illustratively, the rear perspective view of housing 302 shows cavities 304, 306 positioned adjacent sensor recess 308. Such recess is configured with an access slot 310 so that sensing portion 91 of sensor 26 can read the target as described in previous embodiments. Cavities 304, 306 are configured to receive bias plugs 312, 314. The plugs are, illustratively, made from a resilient material, like a rubber, so that they bias against sensor 26 while seated in recess 308, ensuring a snug fit. This prevents movement of sensing portion 91 relative to slot 316 during operation of the gripper assembly. Also shown in FIG. 12 are slots 36, each configured to receive a fastener to secure assembly 300 to a gripper assembly, like that of gripper 1 shown in FIG. 1.

Figure 13:
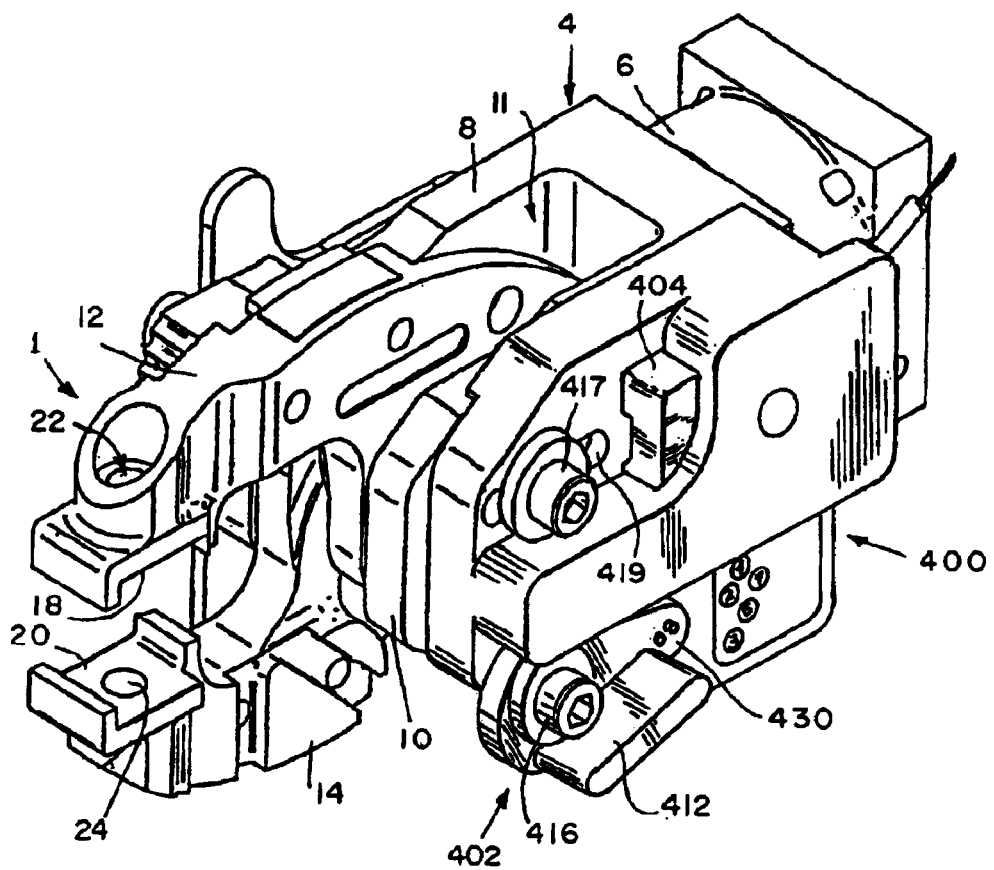
FIG. 13 is a perspective view of another embodiment of the article sensor assembly.

Another illustrative embodiment of an article sensor assembly 400 is shown attached to gripper 1 in FIG. 13. Similar to the previous embodiments, gripper 1, illustratively, comprises a yoke structure 4 which is coupled to a body 6. Yoke structure 4 is defined by two, generally parallel, spaced apart side walls 8, 10.

According to the illustrated embodiment, each wall 8, 10 extends outwardly from the body 6, with a cut-out portion 11 located there between. A pair of opposable jaw members 12, 14 are located in cut-out portion 11. Illustratively, each jaw member 12, 14 is pivotable about a common axis and comprises jaw member tips 18, 20. Jaw tips 18, 20 are located at the ends of jaw members 12, 14, respectively, oppose each other, are movable between open and closed positions as jaw members 12, 14 move, and are configured to receive gripper tips (not shown) of any variety for carrying a workpiece. Each jaw member tip 18, 20, illustratively, includes a threaded bore 22, 24, respectively, each configured to receive a corresponding threaded screw of a gripper tip.

Article sensor assembly 400 is, illustratively, attached to wall 10 of yoke structure 4. As jaw members 12, 14 move, a sensor 404, similar to that of sensor 26, detects such movement, the same as described in the previous embodiments. In the illustrated embodiment, article sensor assembly 400 comprises a can lever 402 configured to adjust the positioning of sensor 404 relative to gripper 1.

Figure 14:
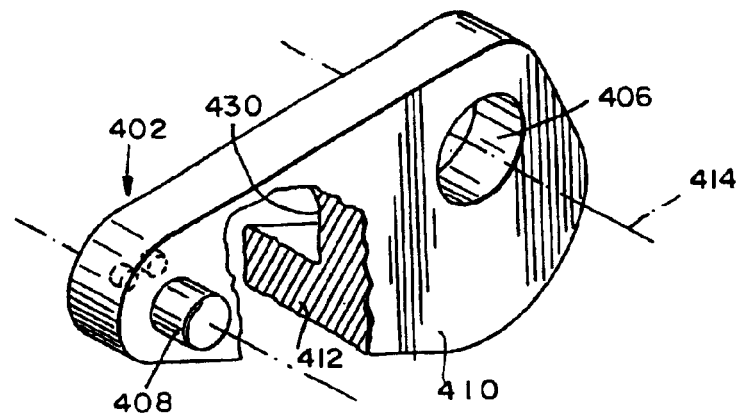
FIG. 14 is a partially cross-sectional view of a cam lever according to the embodiment shown in FIG. 13.

As shown in FIG. 14, cam lever 402 comprises a pivot bore 406 disposed there through. Lever 402 is configured to pivot about axis 414 when a bolt 416 is extended therein. (See FIGS. 13 and 15.) An alignment pin 408 extends from the inner surface 410 of lever 402. Pin 408 is configured to be selectively disposed in one of several cavities 418, 420, 422, 424, 426, 428, 429. (See also FIGS. 15 through 18.) A finger grip 412 extends from the facing 430 of lever 402. The grip 412 allows an operator to grasp lever 402 for the purposes of adjusting it.

Figure 15:
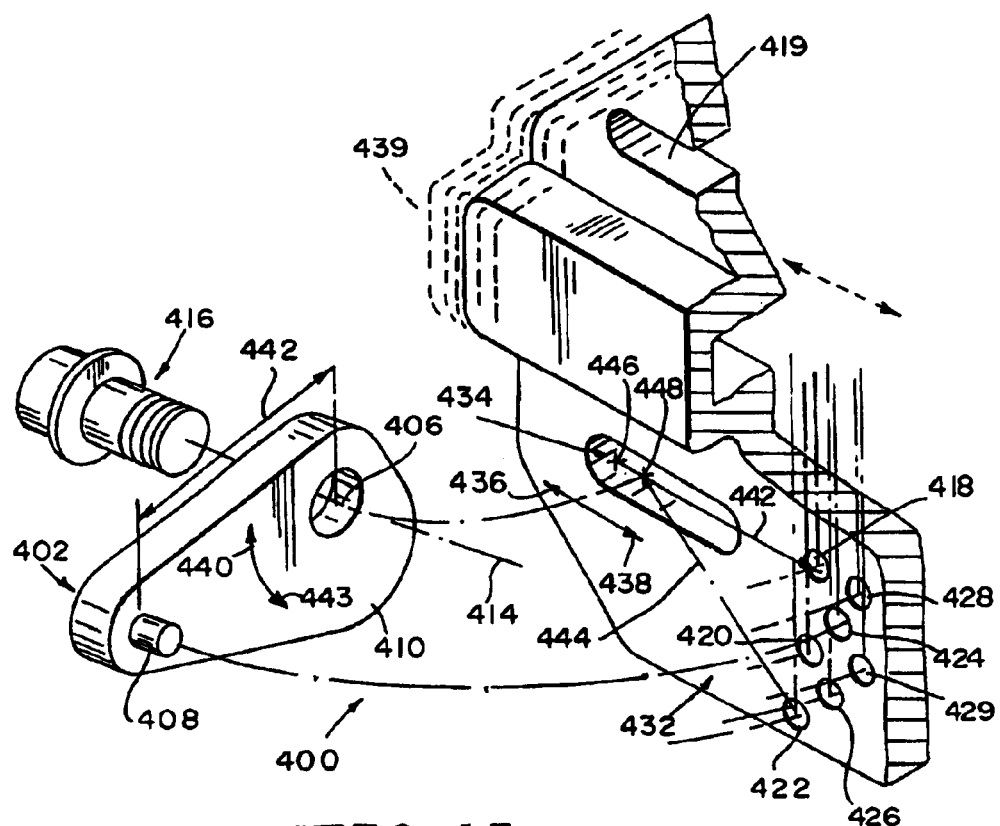
FIG. 15 is a partially cross-sectional exploded view of a portion of the article sensor assembly of FIG. 13.

A partially cross-sectional exploded view of article sensor assembly 400 is shown in FIG. 15. Lever 402 serves to selectively hold housing 432 adjacent gripper 1. Fastener 416 is, illustratively, configured to extend through bore 406 and through slot 434 and fasten to gripper 1. This means that lever 402 will remain in a fixed position relative to housing 432 in opposing directions 436, 438. In the illustrated embodiment, opposing directions 436,438 run substantially parallel to slot 434. Lever 402, however, can still pivot about axis 414 in directions 440, 443. Accordingly, pin 408 may move circumferentially, while the housing 432 moves longitudinally, and engage predetermined cavities 418, 420, 422, 424, 426, 428, 429 to locate housing 432 at predetermined locations relative to gripper 1. (See also FIGS. 16 through 18.) Each of the cavities 418, 420, 422, 424, 426, 428, 429 represents a unique position. For example, lines 442, 444 represent the distance from pin 408 to axis 414 relative to the movement of housing 432, represented by the hatched lines indicated by reference numeral 439. If pin 408 is located in cavity 418, the location of the axis 414, represented by point 446, relative to housing 432 is different than the location of point 448 of line 444 which represents the distance from axis 416 to pin 408, if located in cavity 422.

Selectively adjusting the position of housing 432 relative to gripper 1 has the net effect of relocating the position the sensor 404 will detect the target. (See, also, FIGS. 4 through 6 and FIGS. 10 and 11.) As previously discussed, selectively relocating the position at which sensor 404 will detect the target translates into the target activating the sensor 404 when the jaw members 12, 14 are separated at correspondingly unique positions.

Moving assembly 400 is similar to that of the previous embodiments. Illustratively, the first step is to loosen fasteners 416, 417. Fastener 417 is disposed through slot 419 which allows linear movement of assembly 400 relative to gripper 1 in either direction 436 or 438. After fastener 416 is loosened, pin 408 is removed from whichever cavity it is extended into, and by moving lever 402 in either direction 440 or 443, and moving housing 432 in either direction 436 or 438, pin 408 will be able to extend through any of the other cavities. Grip 412 allows the operator to conveniently move lever 402 in either direction 440, 443. Once pin 402 is placed in one of the cavities 418, 420, 422, 424, 426, 428 or 429, fasteners 416, 417 are tightened to secure assembly 400 to gripper 1.

Figure 16:
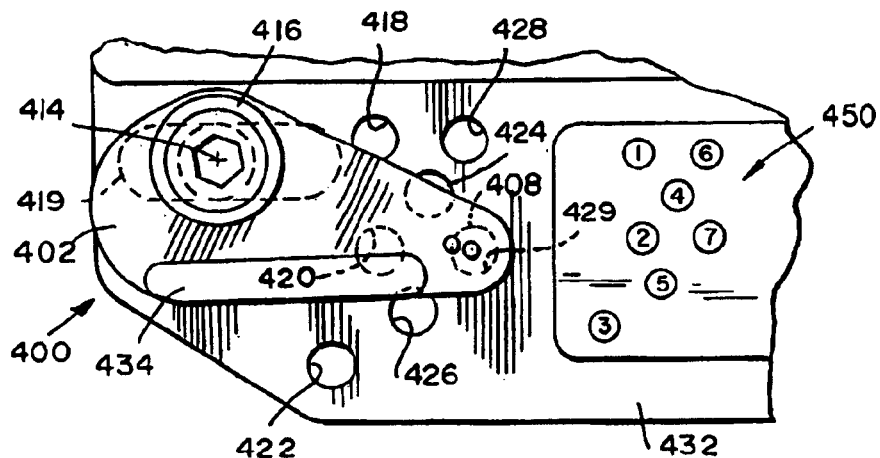
FIG. 16 is a side view of a portion of the article sensor assembly of FIG. 13 showing the cam lever in one illustrative position.
Figure 17:
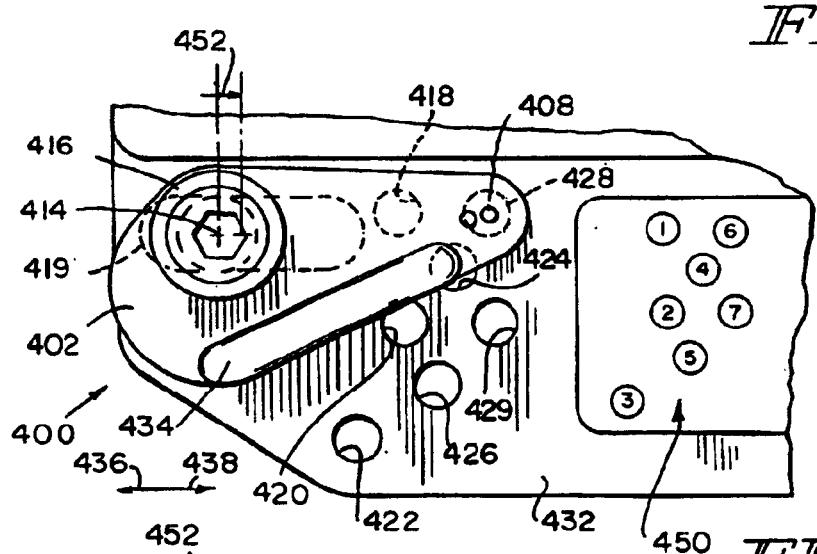
FIG. 17 is another side view of a portion of the article sensor assembly of FIG. 13 showing the cam lever in a second illustrative position.
Figure 18:
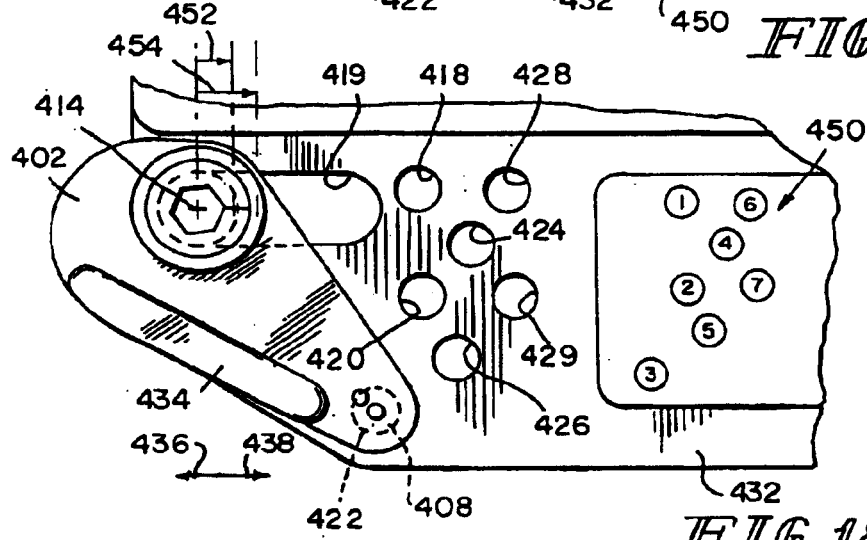
FIG. 18 is another side view of a portion of the article sensor assembly of FIG. 13 showing the cam lever in a third illustrative position.

A comparison of the unique positions of housing 432 relative to axis 414, which translates into unique positions of housing 432 relative to gripper 1, is shown in FIGS. 16 through 18. In the illustrated embodiment, a guide 450 is located on housing 432. Guide 450 includes numbered designations 1 through 7, each of which corresponds to cavities 418, 420, 422, 424, 426, 428, 429, respectively. These designations indicate to the operator the affect of locating pin 408 in a particular cavity. For example, as shown in FIG. 16, pin 408 is located in cavity 429 which corresponds to designation 7 of guide 450. When pin 408 is moved to cavity 428, corresponding to designation 6 of guide 450, as shown in FIG. 17, housing 432 is moved relative to axis 414 a distance 452 in direction 438. Similarly, when pin 408 is moved to cavity 422, corresponding to designation 3 of guide 450, as shown in FIG. 18, housing 432 is moved relative to axis 414 a distance indicated by reference numeral 454, also in direction 438. Moving pin 408 to any of the other cavities will correspondingly move housing 432 in either direction 436 or 438 which moves the location where switch 404 will detect a target, like that shown in FIGS. 4 through 6.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A fluid actuated parts gripper assembly comprising:
   first and second opposable jaw members;
   a fluid driven actuator configured to move at least one of the first and second opposable jaw members;
   a sensor target movable with at least one of the first and second opposable jaw members;
   a mounting located adjacent the sensor target; and
   a sensor mounted on the mounting configured to detect the sensor target;
   wherein the mounting is adjustable relative to the sensor target.

2. The gripper assembly of claim 1, wherein the mounting is adjustable relative to the sensor target.

3. The gripper assembly of claim 1, wherein the sensor is fixed relative to the mounting.

4. The gripper assembly of claim 1, wherein the mounting is configured to receive the sensor target, and wherein the sensor target is moveable within the mounting.

5. The gripper assembly of claim 4, wherein the mounting includes a slot within which the sensor target is moveable.

6. The gripper assembly of claim 1, wherein the mounting comprising at least one slot configured to receive a fastener that selectively fixes the mounting to the gripper.

7. The gripper assembly of claim 6, wherein the at least one slot is a pair of slots.

8. The gripper assembly of claim 1, wherein ad adjustment member is coupled to the mounting for incrementally adjusting the location of the mounting relative to at least one of the pair of jaw members.

9. The gripper assembly of claim 8, wherein the adjustment number is an adjustable spacer comprising a body having a plurality of sides, each of the plurality of sides located at a different length from a central location on the body.

10. The gripper assembly of claim 9, wherein the central location of the adjustable spacer is a bore disposed there through.

11. The gripper assembly of claim 9, wherein the adjustable spacer has opposed surfaces, each being non-equidistant from the location.

12. The gripper assembly of claim 11, wherein the adjustable spacer is a hexagonal body with opposed surfaces each being non-equidistant from the location.

13. The gripper assembly of claim 12, wherein the at least one of the opposed surfaces of the adjustable spacer is positionable adjacent an abutment located on the mounting to selectively reposition the mounting relative to the gripper assembly.

14. The gripper assembly of claim 8, wherein the member is a pivot body that pivots about an axis of rotation and is engagable with a portion of the mounting a distance spaced apart from the axis of rotation.

15. The gripper assembly of claim 14, wherein an engagement member attached to the pivot body is engagable to a corresponding receiver in the mounting to secure the mounting to the gripper assembly a determined position.

16. The gripper assembly of claim 15, wherein the engagement member is engagable with a plurality of receivers in the mountings.

* * * * *